E. R. BEEMAN & T. BRENNAN, Jr.
DISK FURROW OPENER.
APPLICATION FILED SEPT. 6, 1910.
1,001,920.
Patented Aug. 29, 1911.
2 SHEETS—SHEET 1.
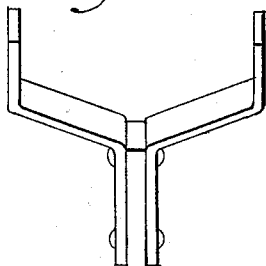
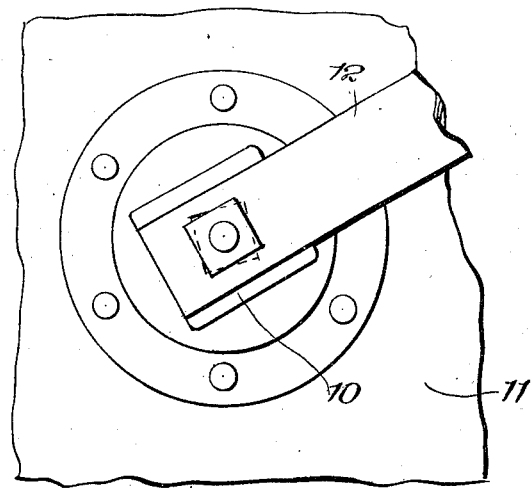
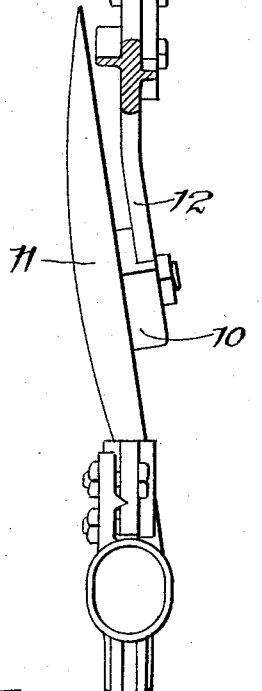

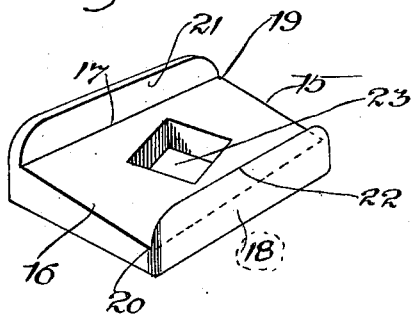
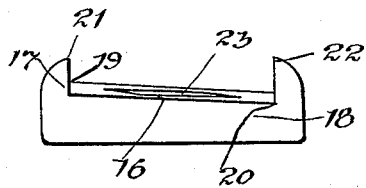
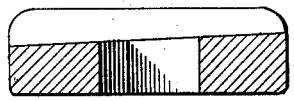
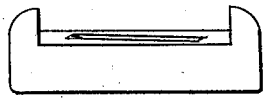
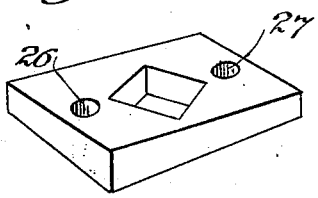
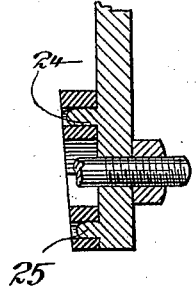

UNITED STATES PATENT OFFICE.

EDWIN R. BEEMAN AND THOMAS BRENNAN, JR., OF MINNEAPOLIS, MINNESOTA, ASSIGNORS TO THE MONITOR DRILL COMPANY, OF MINNEAPOLIS, MINNESOTA, A CORPORATION OF MINNESOTA.

DISK FURROW-OPENER.

1,001,920. Specification of Letters Patent. Patented Aug. 29, 1911.

Application filed September 6, 1910. Serial No. 580,607.

*To all whom it may concern:*

Be it known that we, EDWIN R. BEEMAN and THOMAS BRENNAN, Jr., both citizens of the United States, and both residing at Minneapolis, in the county of Hennepin and State of Minnesota, have invented certain new and useful Improvements Concerning Disk Furrow-Openers, of which the following is a specification.

The action of a single disk furrow opener when in use depends very largely upon the character of the soil being turned and the angle which the general plane of the disk makes with the direction of movement. In order to get the best results when turning some soils, the disk should be practically vertical but inclined to an angle with respect to the direction of travel of the furrow opener. When turning other soils, the disk should be inclined to an angle with the direction of motion and also its top portion should be tilted toward its convex side. Also, the degree of the angle of incline and of tilt will depend upon the nature of the soil and the form of the furrow to be opened.

In general the quality of soil and the uses to which the furrow openers are to be placed in any given locality are fairly uniform, so that all of the furrow openers used in that locality are substantially alike. Thus, for example, in the Northwest the majority of the disks are used with only a slight angle between the general plane of the disk and the direction of travel, and the disks stand practically vertical, whereas in the Southwest the majority of the disks are inclined to a considerable angle from the direction of travel and they are tilted out to give considerable " suction " in their lower portions. When it is necessary to manufacture a large number of different standards of disk, the cost of manufacture is increased and the amount of stock which must be kept on hand by any dealer is very large: he must be prepared to deliver any one of a number of styles of furrow opener. It very often happens, also, that a farmer desires to make use of furrow openers having different angles, either on account of change in the condition of the soil or on account of using the furrow openers for different purposes. Evidently, when each furrow opener is made with a fixed angle and tilt the farmer must carry a number of styles in his equipment to get the best results.

The main object of this invention is to provide a construction of furrow opener of simple design such that the angle between the general plane of the disk and the direction of travel of the furrow opener and the amount of tilt out of the vertical can be very easily changed without the necessity of using special tools and without the necessity of adjusting a number of parts, so that the manufacturer can assemble standard disks on standard drawbars to give any angle desired, thus permitting him to supply furrow openers for any requirements out of one stock of standard parts, and so that the farmer can change the afore-mentioned angle or tilt, or both, according to his requirements at any time.

Other objects and uses will appear from a detailed description of the invention, which consists in the details of construction and combination of parts hereinafter described and claimed.

In the drawings—Figure 1 shows a plan view of one form of furrow opener, showing the relation which the disk bears to the drawbar; Fig. 2 is a detail side elevation of the central portion of the disk and the end of the drawbar; Fig. 3 is a detail cross section of the central portion of the disk and associated parts, showing one form of hub attached to the disk and showing the manner in which our improved washer serves to support the same on the drawbar at the proper predetermined angle; Fig. 4 is a perspective view of one form of our improved adjustment washer, it being beveled in two directions, both from front to rear and from top to bottom; Fig. 5 is an end view of the washer of Fig. 4; Fig. 6 is a cross-section of a washer similar to that of Fig. 4, but beveled in only one direction, viz: from front to rear; Fig. 7 is an end view of the washer of Fig. 6; Fig. 8 is a perspective view of a modified form of washer beveled in two directions but perfectly flat on both sides, so that it may be turned over to present either face to the drawbar; and Fig. 9 is a cross-section taken through the washer of Fig. 8 and showing the same as applied to the end of a modified form of drawbar.

In the embodiment of our invention we provide an adjustment washer which is interposed between the hub of the disk and the end of the drawbar, or is attached to these parts in such a way as to determine the exact angles which the hub of the disk shall bear with respect to the drawbar, thus also determining the angle between the general plane of the disk and the drawbar and thus fixing the angle between the disk and the general direction of travel and the amount of tilt of the disk. Evidently by changing the washer or by reversing one which has been previously used the adjustment of the disk will be changed.

Referring now to Figs. 1, 2 and 3 of the drawings, the adjustment washer 10 is interposed between the disk 11 and the end of the drawbar 12. In practice it is necessary to support the disk in such a way as to permit its rotation about the hub and it is customary to permit of certain slight automatic angular adjustments between the disk and the drawbar to compensate for wear of the former and to insure proper contact between the disk and the scraper. These angular movements of the disk, however, are comparatively small and do not need to be considered. In this application we do not concern ourselves with the exact form of hub whereby the disk is supported, beyond the fact that said hub should be provided with a bolt whereby it may be securely attached to the drawbar. In the construction illustrated the hub is provided with a rectangular head 13 and a bolt 14 passing through the same.

The preferred form of washer is illustrated in Figs. 4 and 5. It is beveled from the end 15 toward the end 16 and from the side 17 toward the side 18, and its inner and outer faces are plane. Therefore it diminishes in thickness uniformly from the corner 19 to the corner 20. On the upper and lower edges of one side it is provided with ribs 21 and 22 spaced to provide a channel between them of width to loosely receive the end of the drawbar. In its central portion it is provided with a hole 23 of size and shape to receive the head 13, to prevent rotation of the latter and therefore of the hub with respect to the drawbar.

By inserting the above described washer between the hub and drawbar with its edge 17 upward and its end 15 forward, the disk will be supported in such a way that its upper edge will be tilted out beyond its lower edge in the direction of its convex side, and the forward edge of the disk will be twisted outward with respect to the rear edge thereof, also in the direction of the convex side. By loosening the bolt sufficiently to permit this washer to be turned 180 degrees, thus bringing the edge 18 upward and the end 16 forward, the tilt and incline of the disk will be reversed, and by properly forming the drawbar the parts can be so proportioned that the disk will now stand practically vertical and practically in the direction of travel of the furrow opener. Thus by merely reversing the washer the characteristics of the furrow opener are changed in such a way as to adapt it for a new and different service. By merely removing the nut from the bolt 14 so that the washer can be removed entirely, and then by inserting a different washer formed with different angles between its faces the disk can be supported at any angle desired.

In Figs. 6 and 7 we illustrate a form of washer which is beveled only from front to rear. When using this washer the disk will always maintain the same angle with respect to the vertical and only its angle of set with respect to the direction of travel will be changed by reversing the washer.

In Figs. 8 and 9 we illustrate a form of washer somewhat different from either of those above shown and described. In this case the washer is not provided with ribs 21 and 22, but is perfectly plane on both sides. The end of the drawbar is provided with a pair of lugs 24 and 25, adapted to engage holes 26 and 27 of the washer to prevent its rotation. This washer may be inserted with either face in contact with the side of the drawbar, with either end forward, or with either edge upward; thus the same washer may be used for a number of different adjustments, permitting its use under a wide range of conditions.

It will be understood that we do not limit ourselves to any particular form of washer nor even to the washers herein illustrated except as specified in the claims, but we include within the scope of our invention any equivalent construction for determining the position in which the disk is supported with respect to the drawbar.

We claim:

1. In combination with a draw bar and a disk mounting, provided with a non-circular neck, an adjustment washer interposed between the draw bar and the disk mounting, and provided on its upper and lower edges with ribs suitably spaced to engage the edges of the draw bar to prevent rotation of the adjustment washer with respect to the same, and provided in its central portion with a non-circular hole adapted to co-act with the neck of the disk mounting to prevent rotation of the same with respect to the washer, the washer tapering from end to end, substantially as and for the purpose described.

2. In combination with a draw-bar and a disk mounting provided with a non-circular neck, an adjustment washer interposed between the draw-bar and the disk mounting and provided on its upper and lower edges with ribs suitably spaced to engage the edges of the draw-bar to prevent rotation of the adjustment washer with respect to the same, and provided in its central portion with a non-circular hole adapted to co-act with the neck of the disk mounting to prevent rotation of the same with respect to the washer, the washer tapering from one corner to the diagonally opposite corner, substantially as and for the purpose set forth.

3. The combination with a draw-bar having its rear portion extending at an angle with the line of draft, a disk mounting on said rear portion and an adjustment washer interposed between the rear portion of the draw-bar and the disk mounting and provided with upper and lower ribs adapted to co-act with the upper and lower edges of the draw-bar and suitably spaced to prevent rotation of the adjustment washer with respect to the draw-bar, the adjustment washer being suitably formed with respect to the disk mounting to maintain the same against rotation and the adjustment washer tapering in thickness from end to end, whereby the adjustment washer serves to maintain the disk mounting against rotation and serves to determine the angle between the disk and the draw-bar, substantially as described.

EDWIN R. BEEMAN.
THOS. BRENNAN, Jr.

Witnesses:
A. R. TARBOX,
C. P. WEYMER.

---

Copies of this patent may be obtained for five cents each, by addressing the "Commissioner of Patents, Washington, D. C."